July 16, 1929.  E. W. JOHNSON  1,721,122
POTATO DIGGER ATTACHMENT FOR TRACTORS
Filed Nov. 15, 1926   3 Sheets-Sheet 2
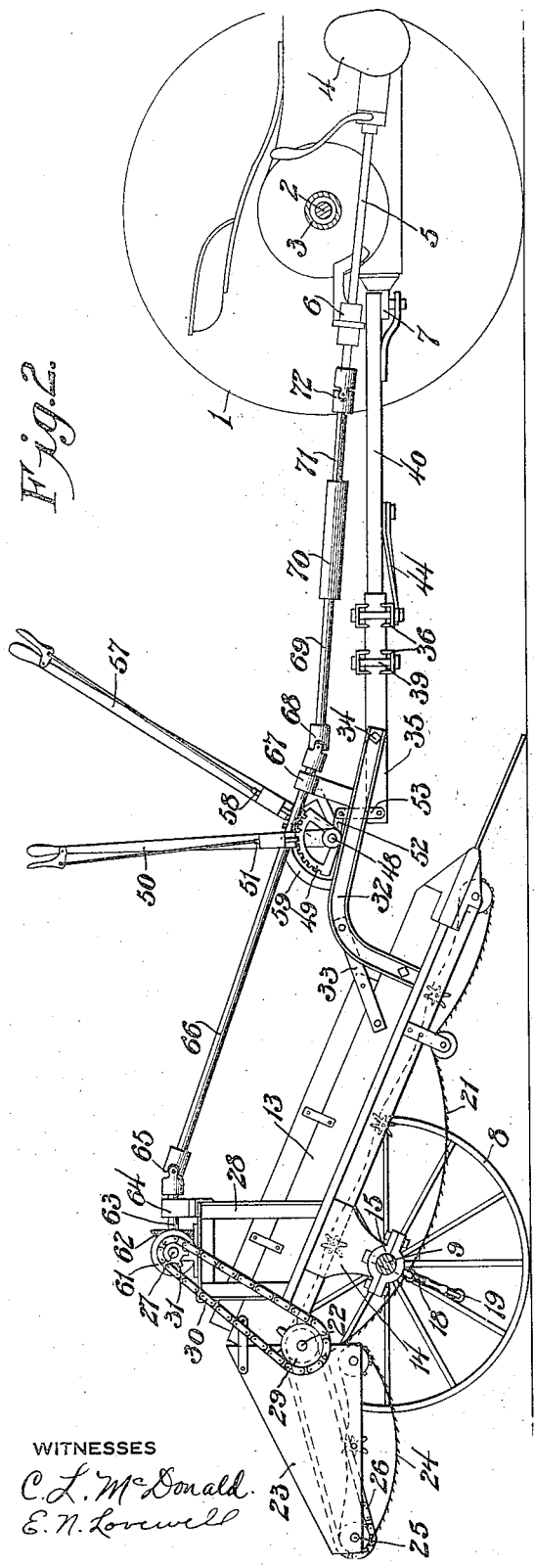
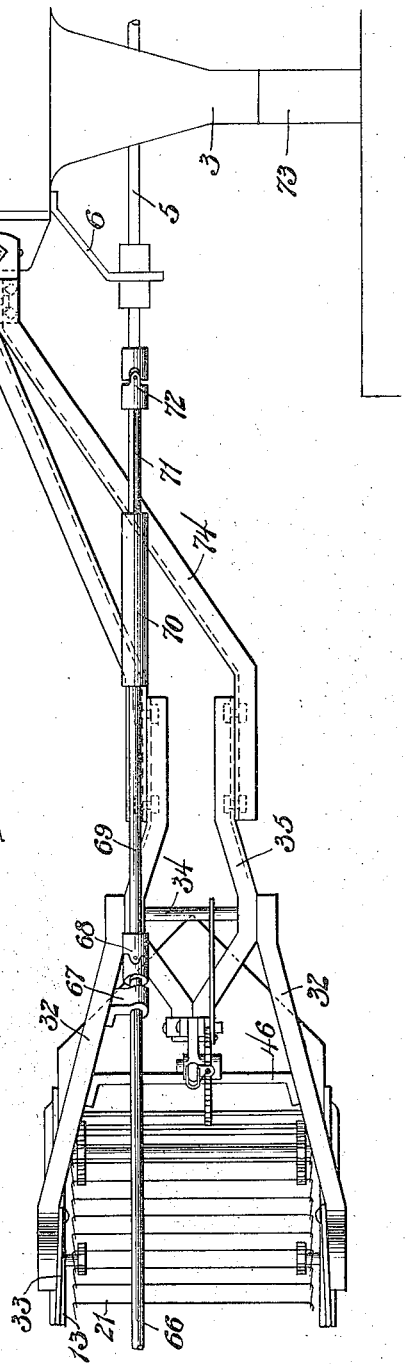
Elmo W. Johnson, INVENTOR

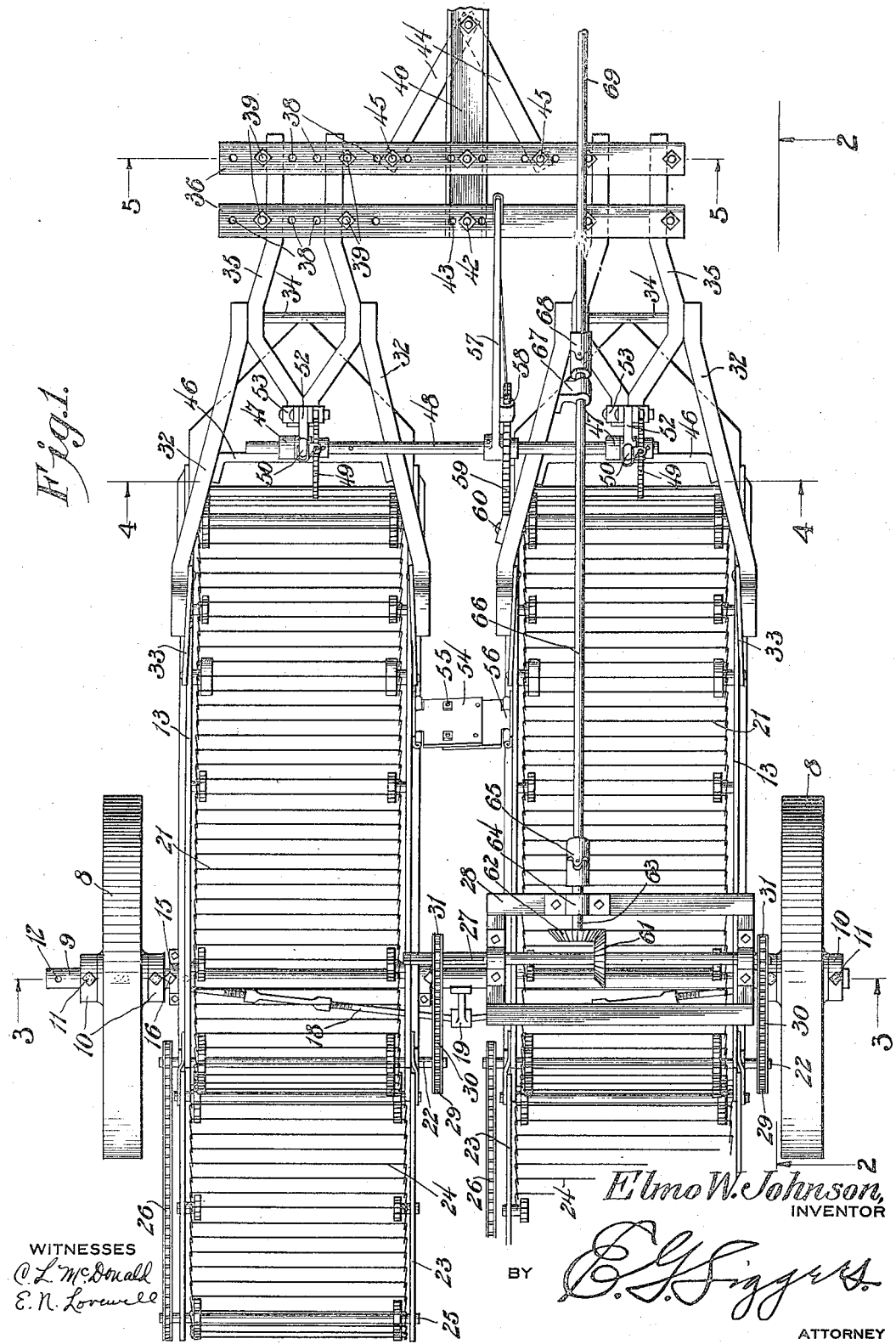

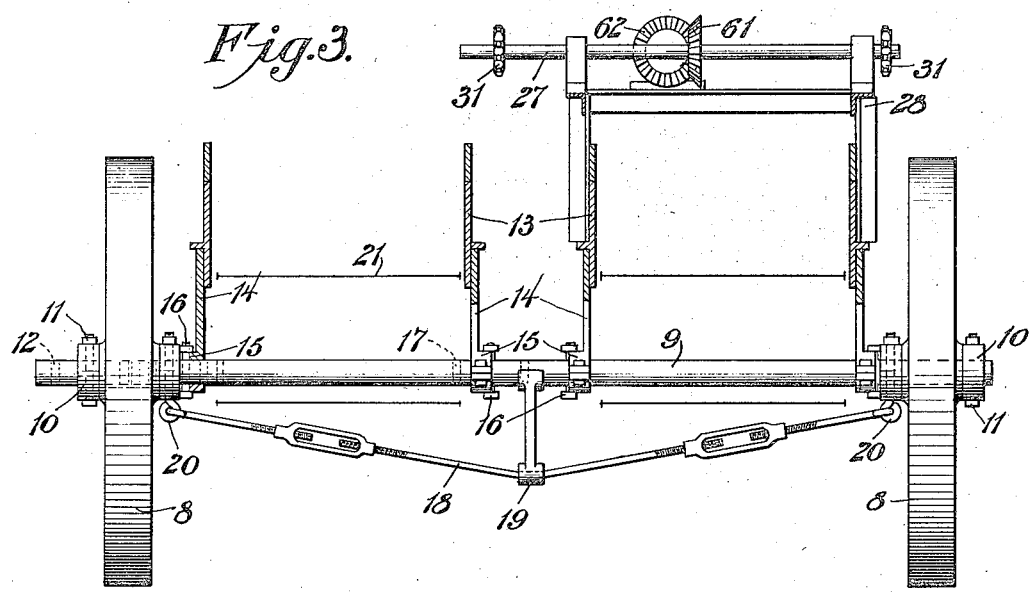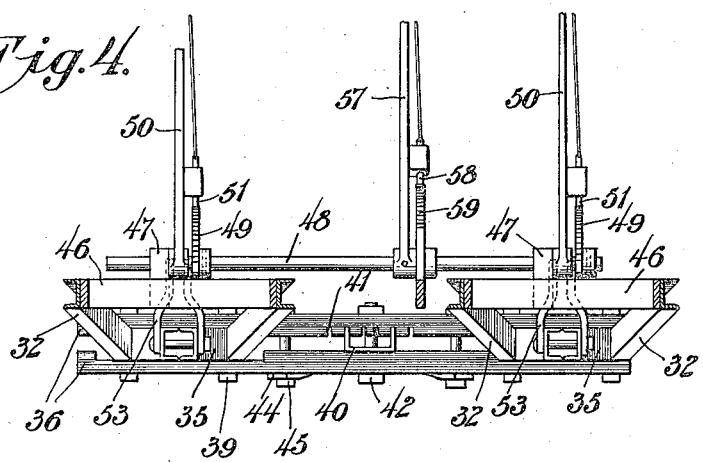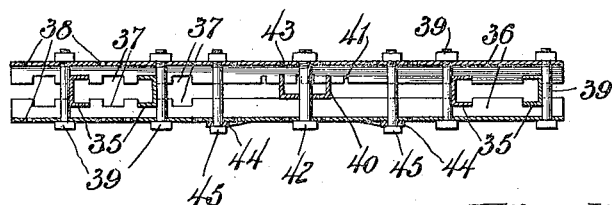

Patented July 16, 1929.

1,721,122

UNITED STATES PATENT OFFICE.

ELMO W. JOHNSON, OF HICKSVILLE, NEW YORK.

POTATO-DIGGER ATTACHMENT FOR TRACTORS.

Application filed November 15, 1926. Serial No. 148,454.

This invention relates to a potato digger adapted to be attached to and operated by a tractor of well-known type, and especially to one which is adapted to dig a plurality of rows simultaneously.

The principal objects of the invention are to provide improved mechanism for driving the elevators from the tractor engine, to make provision for adjusting the digging units laterally to correspond to the distance between the rows, and to provide improved means whereby the digging units may be adjusted either independently or in unison for varying the depth to which they penetrate the soil. Many features of the invention are also adapted to be used on a one row digger.

The specific construction of the invention, together with its objects and advantages, will be more particularly explained in connection with the accompanying drawings, which illustrate the same in its preferred form.

In the drawings:

Figure 1 is a plan view of the invention.

Figure 2 is a side view, on a somewhat reduced scale, taken on the line 2—2 of Figure 1, and showing the digger connected to the rear end of a tractor.

Figure 3 is a section taken substantially on the line 3—3 of Figure 1.

Figure 4 is a section taken on the line 4—4 of Figure 1.

Figure 5 is a section taken on the line 5—5 of Figure 1.

Figure 6 is a plan view of the invention modified to adapt it to a one row digger.

The invention is shown in connection with a tractor of well-known type, having rear traction wheels 1 connected to a rear axle 2, which is mounted within an axle housing 3. The tractor is provided with a well-known form of power take-off mechanism located within a housing 4, and adapted to drive a rearwardly extending shaft 5, which is supported in a bracket 6 attached to the tractor body. The structure is also provided at its rear end with the usual draw bar cap 7 to which the digger is attached.

The digger is supported by ground wheels 8, which are journaled on an axle 9, between collars 10 secured to the axle by bolts 11. The axle 9 is provided with various holes 12 for receiving the bolts 11, so that the wheels 8 may be adjusted lengthwise of the axle at a proper distance apart to straddle two rows, although the distance between the rows varies in different parts of the country.

In the two row digger, as shown in Figures 1, 2 and 3, each digger unit comprises an elevator frame 13 supported by brackets 14, which are formed with bearings 15 mounted on the axle 9 between bolts 16. The axle is provided with various sets of holes 17 for receiving the bolts 16, so as to adjust the digger units at the proper distance apart to correspond to the distance between the rows in the particular field where the digger is used. The axle 9 is reinforced by a truss rod 18, which passes through a strut 19 secured centrally of the axle, and is connected at its ends to tie bolts 20 mounted in the axle near the ground wheels 8.

Within each elevator frame 13 is an elevator 21 of the usual type driven from a shaft 22, which is journaled at the rear end of the elevator frame. A rearwardly extending conveyer frame 23 is secured at the rear end of the elevator frame 13, and contains the usual delivery conveyer 24, which is driven by a shaft 25, journaled in the rear end of the frame 23. The shaft 25 is driven by sprocket gearing 26 from the shaft 22.

In potato diggers as heretofore constructed, the elevator and delivery conveyer have usually been driven from the ground wheels which support the digger. In the present construction, however, they are driven from a jack shaft 27, journaled above one of the elevator frames in a superstructure 28, which is secured to the sides of the elevator frame. Each of the shafts 22 has a sprocket wheel 29 secured to one end thereof, and connected by a sprocket chain 30 to a sprocket wheel 31 on the jack shaft 27. One of the sprocket wheels 31 is rigidly secured to the jack shaft, while the other is splined on the jack shaft, so that it may be adjusted lengthwise thereof to correspond to the adjustment of the lateral distance between the digger units.

Each elevator frame 13 has a pair of forwardly extending curved bars 32 rigidly secured thereto, and reinforced by suitable braces 33. Each pair of bars 32 are forwardly convergent, and at their forward ends are connected by a pivot rod 34 to a yoke 35, which is secured between transverse draft bars 36. These draft bars are provided with a series of opposed notches 37, so that the yokes 35 may be adjusted laterally to correspond to the width between the rows, and beside each notch 37 is a hole 38 for receiving a bolt 39 by which the yoke is securely clamped between the draft bars.

A forwardly projecting channel-shaped tongue 40 is secured to the transverse draft bars 36, and is adjustably connected at its forward end to the draw bar cap 7. One member of each pair of draft bars 36 is provided with a series of notches 41 for receiving the flanges of the tongue 40, so that the latter may be adjusted midway between the yokes 35, and may be secured to the draft bars by bolts 42, a plurality of holes 43 being provided in the draft bars for receiving the bolts. The tongue 40 is further secured by suitable braces 44, which are adjustably secured to the front draft bars 36 by bolts 45.

The depth to which each digger unit penetrates the ground is adjusted by varying the angular relation between the forwardly extending bars 32 and the yoke 35. For this purpose, each pair of bars 32 are rigidly connected by a transverse bar 46, and bearings 47 mounted on the bars 46 support a rock shaft 48. Above each digger unit, a toothed quadrant 49 is secured to the rock shaft 48, and a hand lever 50 is mounted on the rock shaft between the quadrant 49 and the bearing member 47. A thumb latch 51 serves to connect the lever 50 to the quadrant in any position to which the lever may be adjusted. The lever 50 at its lower end has a forwardly projecting arm 52, which is connected by a link 53 to the rear end of the yoke 35. Each lever 50, therefore, may be rocked individually to adjust the forward end of the corresponding digger unit upwardly or downwardly.

The relative position of the digger units is further insured by a pair of intermediate overlapping plates 54, which are adjustably connected by bolts 55. The plates 54 are hinged to the respective elevator frames 13, as shown at 56, so as to permit a limited relative adjustment of the digger upwardly or downwardly, such as is effected by means of the levers 50.

In a two row digger, this relative vertical adjustment of the digger units is necessary for the reason that the wheel 8, which travels over the soft ground, sinks in more deeply than the other wheel, and the digger units must be adjusted to compensate for this. In order to operate the digger efficiently, the depth at which each individual digger unit penetrates the soil must be determined with considerable accuracy. This difference in the adjustment of the two units, though quite necessary, is comparatively small, and the resultant distortion of the connections between the digger units and the tongue are scarcely noticeable.

While the individual digger units may be adjusted by means of the levers 50, they may also be adjusted in unison by means of a master lever 57, secured to the rock shaft 48. This master lever carries a thumb latch 58, adapted to be selectively engaged with the teeth of a quadrant 59, which is secured at 60 to one of the bars 32, and in which the shaft 48 is journaled.

The jack shaft 27, from which the elevators and conveyers are driven, has a bevel gear 61 secured thereto, and meshing with a corresponding bevel gear 62 secured to the rear end of a shaft 63, which is journaled in a bearing 64 on the front rail of the superstructure 28. The shaft 63 is connected by a universal joint 65 to the rear end of a shaft 66. The front end of the shaft 66 is journaled in a bearing 67 supported from one of the bars 32, and is connected by a universal joint 68 with a shaft 69, which has a telescopic connection 70 with a shaft 71, which, in turn, is connected by a universal joint 72 to the rearwardly extending power shaft 5 of the tractor.

While the present invention is particularly concerned with a two row digger, various features thereof may be used in connection with a one row digger, as shown in Figure 6. While either form of digger is adapted to be attached to and operated by an ordinary tractor, it is to be noted that in tractors, as at present constructed, the distance between the wheels is too great for the tractor to straddle a single row, and too small for the tractor to straddle two rows. It is preferred, therefore, to modify the connection between the wheels and the tractor body, as indicated diagrammatically at 73, so that the distance between the centers of the wheels will be exactly equal to the width of two rows. The construction of this feature, however, constitutes no part of the present invention, but is more particularly described and claimed in my Patent No. 1,606,077, issued November 9, 1926. In using a one row, digger, in connection with such a tractor, it is desirable that the wheels of the digger shall straddle one of the rows which are straddled by the wheels of the tractor, and for this reason, the one row digger is connected to the draw bar cap 7 by laterally offset draw bars 74, which are rigidly secured to the front ends of the yoke 35, as shown in Figure 6.

While I have shown and described specifically the construction which appears to be best adapted for the purpose set forth, it is, of course, to be understood that many details of the same may be considerably modified without any material departure from the salient features of the invention as expressed in the claims.

What is claimed is:

1. In a potato digger attachment for tractors, the combination of a plurality of digger units with potato handling mechanism carried by each unit, wheels supporting said units, means for adjusting the lateral distance between the units to correspond to the distance between the rows to be dug, a superstructure secured to one of said units, a jack shaft journaled in said superstructure above the potato handling mechanism, means individual to the potato handling mechanism on each unit for driving the same from said jack shaft, and means for driving said jack shaft from the engine of the tractor.

2. A potato digger comprising a plurality of units for digging a plurality of rows simultaneously, each unit comprising means for conveying the potatoes upwardly and rearwardly, means for bodily adjusting one unit laterally with respect to the other unit to correspond to different distances between the rows, means for connecting and supporting the front ends of said units on a tractor, and means for operating the conveyer mechanism on each digger unit from the tractor engine.

3. In a potato digger attachment for tractors, the combination of a wheel supported axle, a plurality of digger units mounted on said axle and adjustable lengthwise thereof to correspond to different widths between the rows to be dug, a draft attachment including a transverse bar with rearwardly projecting members connected to the respective digger units, said rearwardly projecting members being laterally adjustable on the bar to correspond to the lateral adjustment of the digger units, means individual to each digger unit for adjusting the angle between the same and the rearwardly extending draft member to which it is connected, whereby to vary the depth to which the corresponding digger unit penetrates the ground, and supplemental means for simultaneously adjusting the angular relation between both rearwardly extending draft members and the corresponding digger units.

In testimony, that I claim the foregoing as my own, I have hereto affixed my signature.

ELMO W. JOHNSON.